United States Patent [19]
Nebel

[11] Patent Number: 5,791,715
[45] Date of Patent: Aug. 11, 1998

[54] EXTENSION MECHANISM FOR TRAVEL TRAILER SLIDE-OUT ROOMS

[76] Inventor: Michael W. Nebel, Route 3, Box 6-A, Smith Center, Kans. 66967

[21] Appl. No.: 754,872

[22] Filed: Nov. 22, 1996

[51] Int. Cl.[6] ........................................ B60P 3/35
[52] U.S. Cl. ............................ 296/26; 296/171; 296/175; 52/67
[58] Field of Search ............................. 296/165, 170, 296/171, 172, 175, 176, 26, 27; 52/67

[56] References Cited

U.S. PATENT DOCUMENTS

| Re. 32,262 | 10/1986 | Stewart. | |
|---|---|---|---|
| 2,225,319 | 12/1940 | Rollo. | |
| 2,606,057 | 8/1952 | Johnson. | |
| 2,820,666 | 1/1958 | Grochmal. | |
| 3,512,315 | 5/1970 | Vitalini | 52/67 |
| 3,572,809 | 3/1971 | Buland | 296/26 |
| 4,312,159 | 1/1982 | Paul. | |
| 4,500,132 | 2/1985 | Yoder. | |
| 5,237,782 | 8/1993 | Cooper. | |
| 5,332,276 | 7/1994 | Blodgett, Jr.. | |
| 5,333,420 | 8/1994 | Eden. | |
| 5,491,933 | 2/1996 | Miller. | |
| 5,577,351 | 11/1996 | Dewald, Jr. et al. | 296/171 |
| 5,620,224 | 4/1997 | DiBiagio et al. | 296/165 |

OTHER PUBLICATIONS

Drawings of Slideout Mechanism #1, Peterson Industries, Inc., Smith Center, Kansas, showing slide-out mechanism which was on sale and in public use more than one year prior to the filing date of this application. (No Date).

Drawings of Slideout Mechanism #2, Peterson Industries, Inc., Smith Center, Kansas, showing slide-out mechanism which was on sale and in public use more than one year prior to the filing date of this application. (No Date).

Primary Examiner—Dean Kramer
Attorney, Agent, or Firm—Litman, McMahon, & Brown, L.L.C.

[57] ABSTRACT

A slide-out mechanism for selectively extending and retracting a slide-out room through a slide-out room opening in a wall which automatically levels or aligns the slide-out room relative to the slide-out room opening in the wall comprises at least one stationary member, a retractable member slidably secured to the stationary member, and a threshold bracket for securing and supporting a front end of the stationary member on an upper surface of a portion of the wall defining a lower edge of the slide-out room opening. A support leg is preferably secured to a rear end of the stationary member for supporting the rear end thereof. The support leg is preferably height adjustable to permit leveling of the rear end of the stationary member relative to the front end.

24 Claims, 3 Drawing Sheets

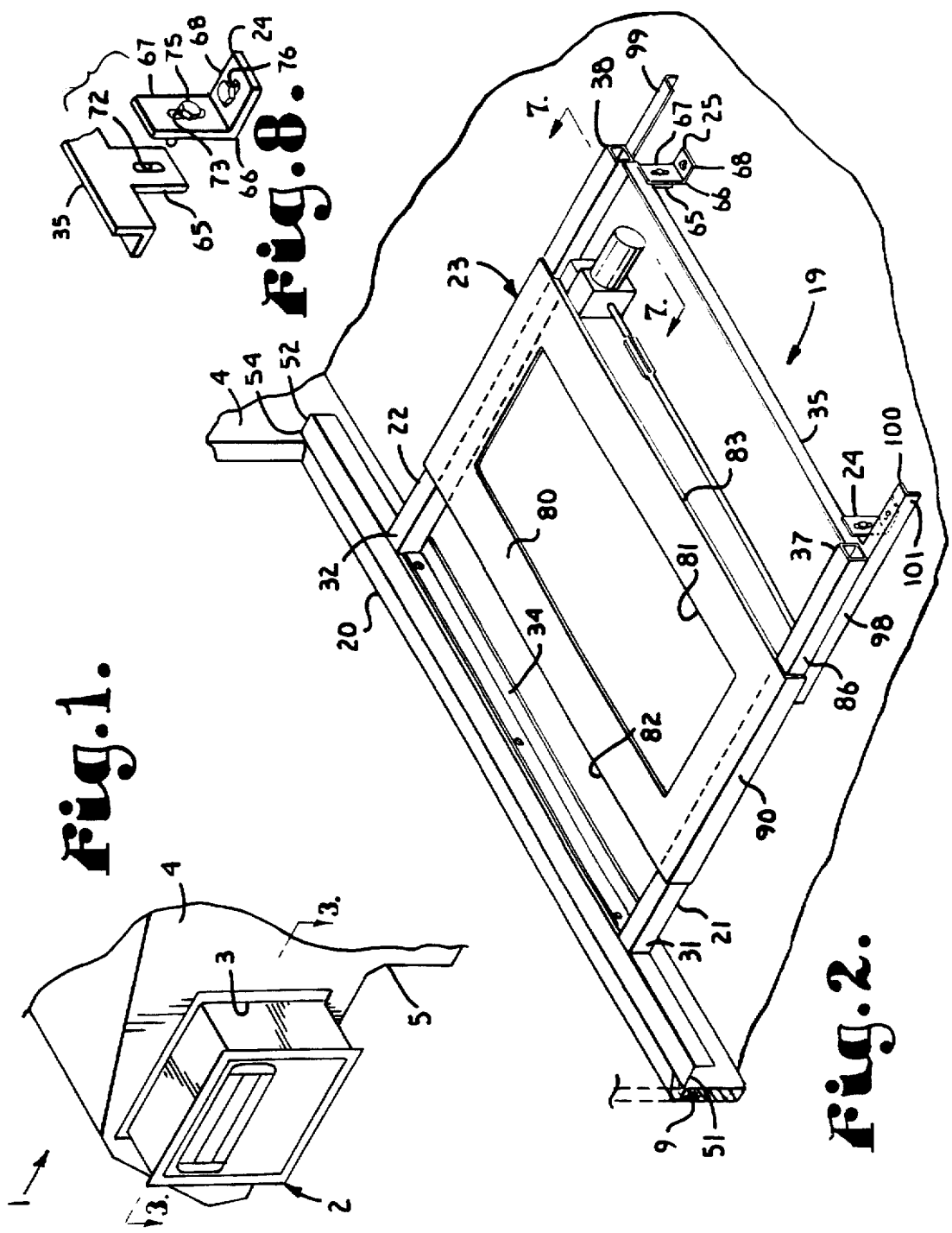

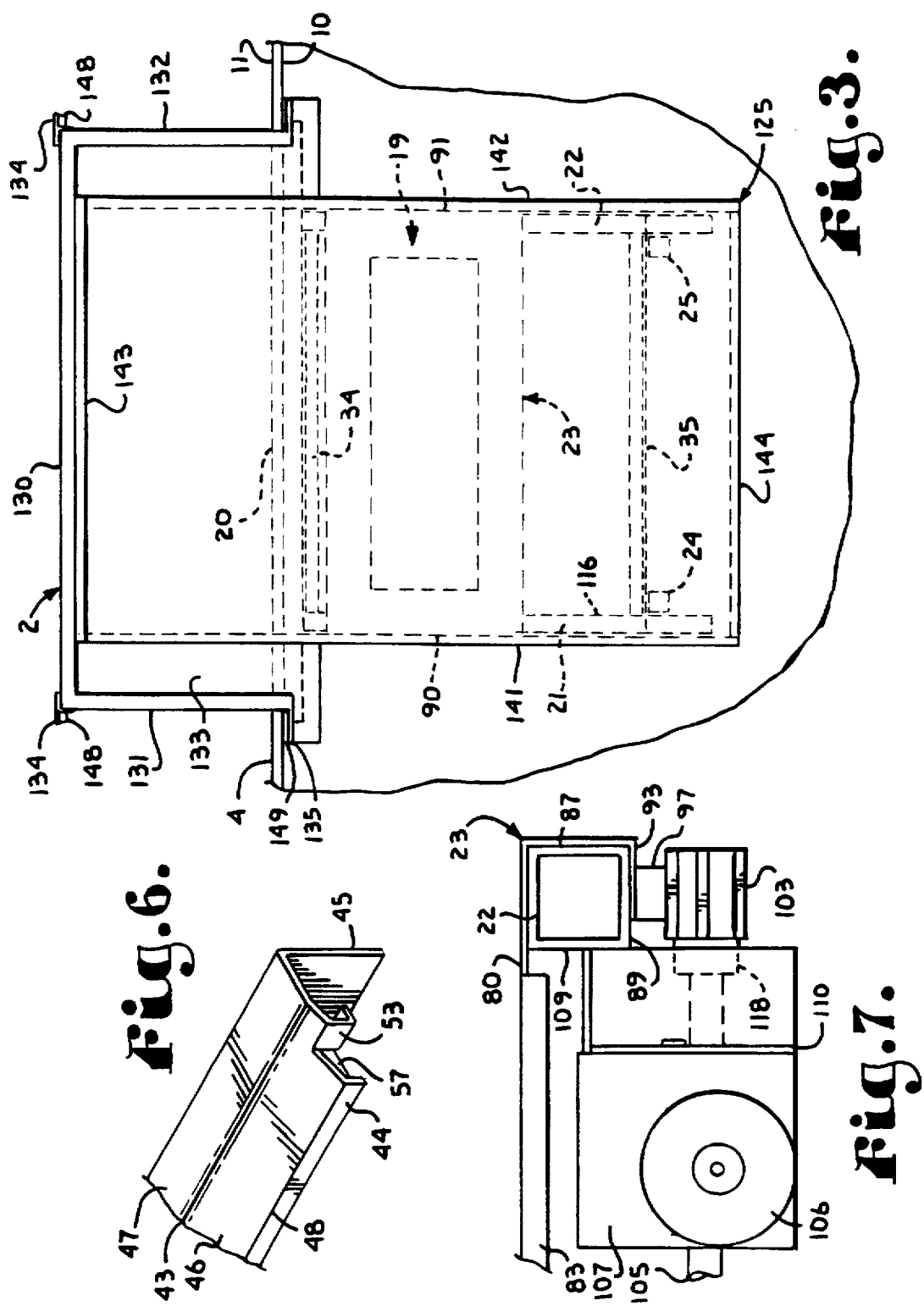

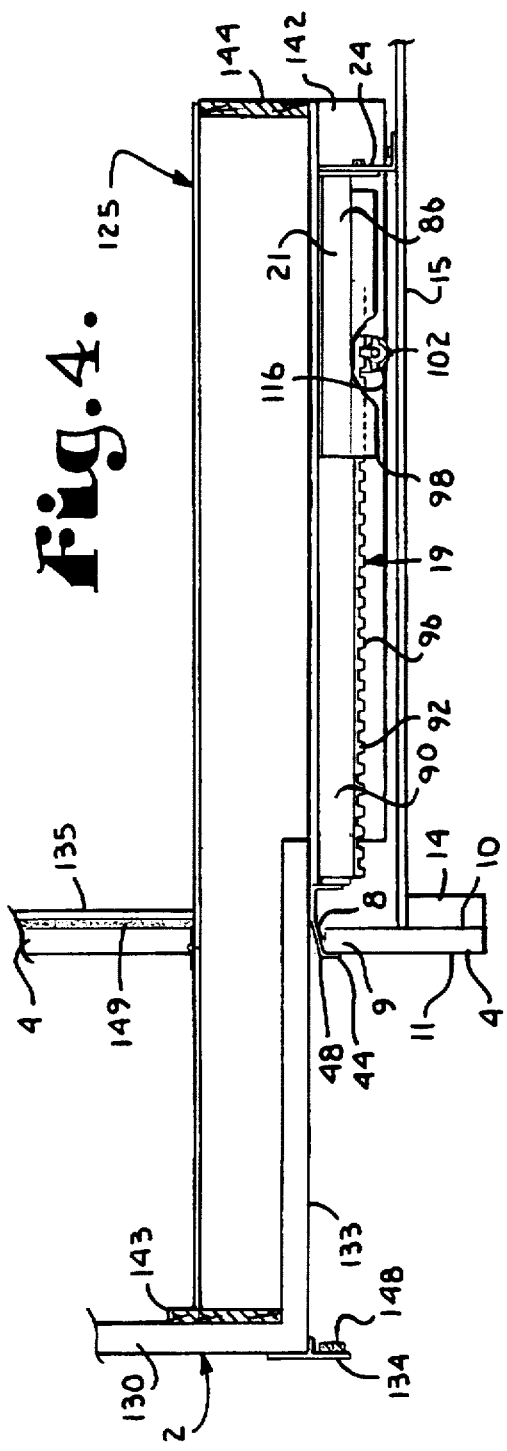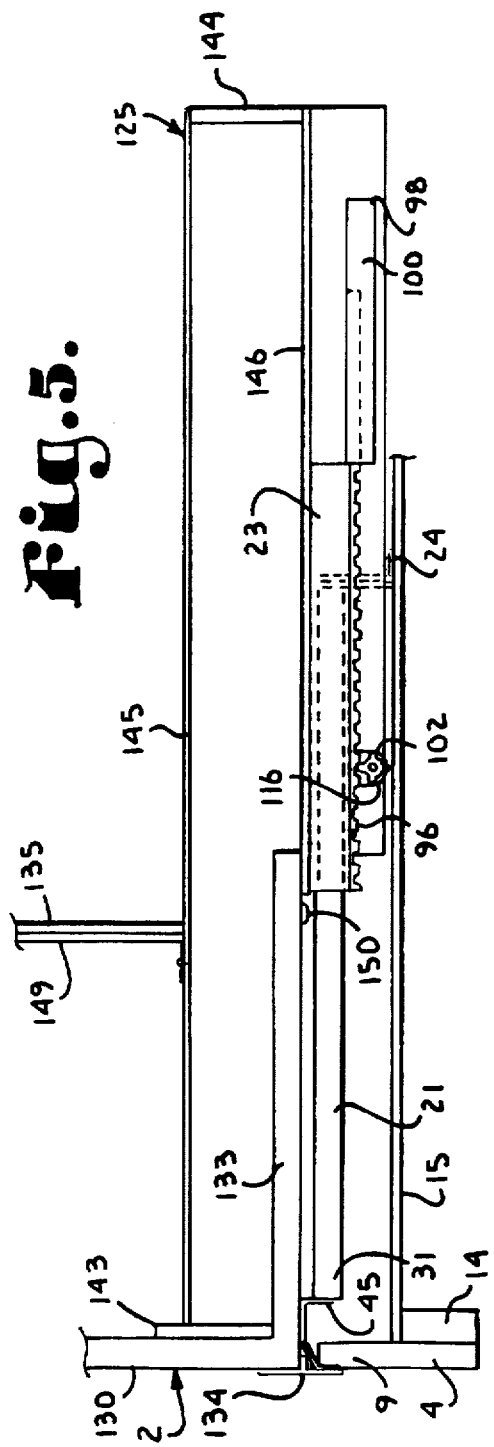

EXTENSION MECHANISM FOR TRAVEL TRAILER SLIDE-OUT ROOMS

BACKGROUND OF THE INVENTION

1. Field of the Invention

The present invention relates to mechanisms for selectively extending and withdrawing slide-out portions of a travel trailer or the like.

2. Prior Art

Slide-out rooms or compartments in travel trailers, motor homes and the like have become increasingly popular. The slide-out rooms allow for increased useable space when the vehicle is parked and are retractable to accommodate width limitations while in transit.

A significant problem with currently available slide-out room mechanisms is that the manner of attachment of the mechanisms to the trailer often results in the slide-out room being mounted in a non-square orientation relative to the slide-out room hole or opening in a sidewall of the vehicle. The non-square orientation of the slide-out room relative to the slide-out room opening causes binding when the room is retracted or extended through the opening and causes problems sealing around the slide-out room.

In most travel trailers, motor homes or similar vehicles, the sidewalls of the vehicle are generally fabricated as a single piece prior to attachment to the frame of the vehicle. Because of controlled assembly conditions, the edges of the sidewalls, including the edges of a slide-out room opening formed therein, are generally square relative to one another. However, for various reasons, when the sidewalls are secured to the vehicle frame the edges of the sidewalls, and in particular the edges of the slide out room opening, may not be square with the edges of the frame or the floor supported on the frame. This is a common problem for the upper portion of the floor and frame in fifth-wheel or gooseneck type trailers.

The frames of gooseneck type trailers are rarely welded together precisely. Therefore, the frame and floor portion above the gooseneck are almost never parallel with the frame and floor portion below the gooseneck. When a sidewall is mounted to the frame, the lower edge of the portion of the sidewall below the gooseneck is generally aligned with the portion of the frame below the gooseneck such that the lower edge of the portion of the sidewall above the gooseneck is not square with the portions of the frame and floor above the gooseneck. Similarly, the edges of a slide-out room opening above the gooseneck usually are not square with the portions of the frame and floor above the gooseneck.

Most slide-out mechanisms mount directly to the frame, generally below the floor, and the slide-out room is mounted to the slide-out mechanism such that the slide-out room is generally mounted square relative to the frame and floor. When the slide-out room opening is not positioned square with the frame and the floor, the slide out room, mounted to the frame by the slide-out mechanism, does not sit or extend squarely into the slide-out room opening. The non-square orientation of the slide-out room relative to the slide-out room opening causes the slide-out room to bind relative to the slide-out room opening as the room is extended and retracted therethrough and increases the difficulty in obtaining a proper seal around the slide-out room.

Another problem associated with existing slide-out mechanisms is the stress placed on the sidewall of the vehicle through which the room is extended and retracted. Most slide-out rooms include some form of inner sealing flange extending perpendicular to the sides and top of the slide-out room along the rear or inner end thereof. When the slide-out room is fully extended, the inner sealing flange engages and pushes against an inner surface of the sidewall of the trailer around the slide-out opening. Similarly, an outer sealing flange, present on most slide-out rooms engages and pushes against an outer surface of the sidewall of the trailer when the room is fully retracted. Over time, the repetitive exertion of these inwardly and outwardly directed forces against the sidewall results in the sidewall being pulled away from the frame.

Therefore, there is a need for a slide-out mechanism that is generally self leveling relative to the slide-out room opening and which reduces the stresses applied to the sidewall of the trailer through repeated extension and retraction of the slide-out room relative thereto.

SUMMARY OF THE INVENTION

The present invention comprises a slide-out mechanism for selectively extending and retracting a slide-out room through a slide-out room opening in a wall which automatically levels or aligns the slide-out room relative to the slide-out room opening in the wall. A front end of the slide-out mechanism is adapted to be supported on an upper surface of a portion of the wall defining a lower edge of the slide-out room opening so as to automatically level or align the slide-out mechanism relative to the slide-out room opening. The portion of the wall defining a lower edge of the slide-out room opening may hereinafter be referred to as the sill of the slide-out room opening.

The mechanism comprises at least one stationary member, a support bracket secured to a front end of the stationary member and a slidable member slidably mounted relative to the stationary member. The front end of the stationary member is adapted to be supported on the upper surface of the sill by the support bracket. The slide-out room is securable to the slidable member for slidable advancement through the slide-out room opening. A support member is preferably secured to a rear end of the stationary member for supporting the rear end thereof. The support member is preferably height adjustable to permit leveling of the rear end of the stationary member relative to the front end.

In a preferred embodiment the stationary member comprises two rails spaced apart in parallel alignment. The support bracket is secured to and extends between the two rails and the slidable member comprises a slide plate slidably mounted to the two rails and extending therebetween. The support bracket further includes an outer lip for engaging an outer surface of the wall through which the slide-out room opening extends and inner lips for engaging an inner surface of the wall. The outer and inner lips anchor the rails to the wall.

OBJECTS AND ADVANTAGES OF THE INVENTION

Therefore it is an object of this invention to provide a slide-out mechanism which automatically aligns a slide-out room secured thereto relative to a slide-out room opening in a wall; to provide such a mechanism which maintains the slide-out room square relative to the slide-out opening through which the slide-out room is to be advanced; to provide such a mechanism in which a front end thereof is adapted to be supported across at least a portion an upper surface of a sill of the slide-out room opening; to provide such a mechanism which is adapted to engage inner and outer surfaces of the wall adjacent the slide-out room opening for anchoring the mechanism thereto; to provide such a mechanism in which a rear end of the mechanism is height adjustable; to provide such a mechanism which facilitates obtaining a weather tight seal around the slide-out room in an extended or retracted alignment; to provide such a mechanism which is sold already assembled and ready for installation; to provide such a mechanism which is easy to install; to provide such a mechanism which may be installed relatively quickly; and to provide such a mechanism which is relatively inexpensive.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of a fifth wheel trailer with a slide-out room shown extended through a slide-out room opening in a sidewall thereof.

FIG. 2 is a perspective view of a slide-out mechanism of the present invention shown supported across the sill of a slide-out room opening by a threshold bracket.

FIG. 3 is an enlarged and fragmentary cross-sectional view of the trailer taken along line 3—3 of FIG. 1 showing the slide-out mechanism in phantom lines beneath a bed frame which is secured to the slide-out mechanism.

FIG. 4 is an enlarged and fragmentary cross-sectional view taken along line 4—4 of FIG. 3 with portions broken away to show detail and showing the slide-out room fully extended through the slide-out opening by the slide-out mechanism.

FIG. 5 is a view similar to FIG. 4 showing the slide-out room fully retracted through the slide-out opening by the slide-out mechanism.

FIG. 6 is an enlarged and fragmentary perspective view of an end of the threshold bracket.

FIG. 7 is an enlarged and fragmentary cross-sectional view taken along line 7—7 of FIG. 2.

FIG. 8 is an enlarged and fragmentary perspective view of an adjustable leg of the slide-out mechanism.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, FIG. 1 shows a portion of a fifth wheel trailer 1 having a slide-out room 2 mounted in a slide-out room opening or hole 3 in a wall 4 thereof. The slide-out room 2 is mounted relative to a portion of the wall 4 above the gooseneck 5 of the trailer 1. Referring to FIG. 4, a lower edge of the slide-out room opening 3 is defined by an upper surface 8 of a portion of the wall 4 which may be referred to as the sill 9 of the slide-out room opening 3. The wall 4 includes inner surface 10 and outer surface 11. The slide-out room 2 is secured relative to the wall above a frame 14 and floor 15 of the trailer 1.

A slide-out mechanism 19 of the present invention is shown in FIG. 2, secured within the slide-out room opening 3 of the trailer 1. The slide-out mechanism 19 includes a support bracket or threshold bracket 20, first and second rails 21 and 22, slide plate or slide member 23, and first and second support legs 24 and 25.

The rails 21 and 22 are preferably formed from square tubing secured together in parallel and spaced apart relation. First or front ends 31 and 32 of rails 21 and 22 respectively are secured together by cross-brace 34 welded to and extending therebetween. The threshold bracket 20 is secured to the front ends 31 and 32 of the rails 21 and 22 respectively by bolting the threshold bracket 20 to the front cross-brace 34. A rear cross brace 35 is welded to and extends between second or rear ends 37 and 38 of the rails 21 and 22.

The threshold bracket 20 is sized to span the entire width of the slide-out room opening 3 and is adapted for placement across the sill 9 of the slide-out room opening 3 to support the rails 21 and 22 thereby. The threshold bracket 20 includes web 43, front depending leg or outer lip 44 and rear depending leg 45 which is bolted to the front cross brace 34. The web 43, includes a front portion 46 and a rear portion 47. When the threshold bracket 20 is positioned across the sill 9, the rear portion 47 generally extends horizontally and the front portion 46 angles slightly downward from horizontal, approximately fifteen degrees toward the front thereof.

The web 43 generally engages the upper surface 8 of the sill 9 along a front edge 48 thereof. The outer lip 44 engages the outer surface 11 of the wall 4 just below the slide-out room opening 3 and preferably spans the entire length of the slide-out room opening 3.

The web 43, across the rear portion 47 and part of the front portion 46, is slightly wider than the slide-out room opening 3 and the front lip 44 so as to generally form first and second extensions 51 and 52. First and second inner lips or shoulders 53 and 54 extend downward from the first and second extensions 51 and 52 respectively. The first and second inner shoulders 53 and 54 are spaced behind the front lip 44 a distance equal to the thickness of the wall 4 such that when the threshold bracket 20 is positioned on the sill 9 the first and second inner shoulders 53 and 54 engage the inner surface 10 of the wall 4 on opposite sides of the slide-out room opening 3.

The threshold bracket 20 is preferably formed from relatively thick steel, such as ten gauge steel, with an aluminum cover. The rigidity of the steel is sufficient to support the weight of the front end of the slide-out room mechanism 19 across the front edge 48 of the threshold bracket 20 without deflection of the bracket 20 downward. First and second triangular supports 57 and 58 (only one of which is shown in FIG. 6) may be formed along the opposite ends of the web 43, extending from the front lip 44 to the first and second inner shoulders 53 and 54 respectively. The supports 57 and 58 provide extra rigidity to the threshold bracket 20 and lower edges thereof also engage the upper surface 8 of the sill 9.

The front portion 46 of the web 43 is angled downward to facilitate the draining away of any moisture blown between the slide-out room 2 and the threshold bracket 20. The threshold bracket 20 is covered with aluminum to resist corrosion and present a more attractive finish. The depending leg 45 of the threshold bracket 20 is spaced behind the first and second inner shoulders 53 and 54 a distance to accommodate a frame member 14 which may extend above the floor 15 depending upon the manufacturer's preference.

The first and second support legs 24 and 25 are secured proximate the rear ends 31 and 32 of the first and second rails 21 and 22 respectively. Each support leg 24 and 25 comprises a slotted flange 65, secured to and depending from the rear cross brace 35 at either end thereof proximate one of the rails 21 and 22, and a slotted angle member 66 secured to a respective slotted flange 65. The angle member includes a vertical leg 67 and a horizontal leg 68. Vertical extending slots 72 and 73 are formed in the flanges 65 and the vertical leg 67 of the angle members 66. The vertical leg 67 of the angle member 66 is secured to an associated flange 65 by a carriage bolt 75 extending through aligned slots 72 and 73. The length of the legs 24 and 25 is adjustable by sliding the vertical leg 67 of the angle member 66 relative to the flange 65 and then tightening down the carriage bolt 75. The horizontal leg 68 of each angle member 66 includes a slot 76 therein for driving a screw or the like therethrough for securing the horizontal leg 68 to the floor 15 of the trailer 1.

After the threshold bracket 20 is positioned across the sill 9 of the slide-out room opening 3, so as to support the front end of the slide-out mechanism 19 thereacross, the height of the rear ends 37 and 38 of the rails 21 and 22 respectively may be adjusted to level the rails 21 and 22 relative to the front ends 31 and 32 by adjusting the length or height of the legs 24 and 25. Independent adjustment of the height of the rear ends 37 and 38 may be necessary because the floor 15 may not be square or level relative to the slide-out room opening 3. Securing the front end of the slide-out mechanism 19 across the sill 9 using the threshold bracket 20 ensures that the front end of the slide-out mechanism is square or level with the slide-out room opening 3. The independent adjustability of the height of the legs 24 and 25 allows for adjustments in the height of the rear end of the slide-out mechanism 19 to ensure that the rear end and therefore the entire slide-out mechanism 19 is square or level with the slide-out room opening 3.

The slide plate 23 includes a top plate 80 which extends across and between the first and second rails 21 and 22. The top plate 80 includes a large cutout portion 81 to reduce the amount of material necessary. Front and rear edges or strips 82 and 83 of the top plate are bent downward to provide greater rigidity to the top plate 80.

As shown in FIG. 7, with respect to the second rail 22, opposite sides of the slide plate 23 generally wrap around outer sides 86 and 87 of the rails 21 and 22 respectively and across bottoms 88 and 89 thereof to slidably secure the slide plate 23 to the rails 21 and 22. In particular, opposite sides of the slide plate 23 include side plates 90 and 91 and bottom plates 92 and 93 respectively. The side plates 90 and 91 extend across respective outer side 86 and 87 of the rails 21 and 22 and the bottom plates 92 and 93 extend across the bottoms 88 and 89 thereof.

Rack gears 96 and 97 are mounted to the bottom plates 92 and 93 respectively on each side of the slide plate 23 and extend in axial alignment to the respective rail 21 and 22. It is foreseen that a cheaper but equally effective alternative to the rack gears 96 and 97 would be to mount to the bottom plates 92 and 93 ladder gears comprising elongate rectangular plates having a succession of holes punched therein in axial alignment and spaced apart a distance corresponding to the width of the teeth of the rack gears 96 and 97.

Bottom plate extenders 98 and 99 are welded to the slide plate 23 on each side thereof so as extend rearwardly from the respective bottom plate 92 and 93 in axial alignment therewith. Each bottom plate extender 98 and 99 is preferably formed from angle iron including a horizontal leg 100, which extends in axial alignment with the respective bottom plate 92 and 93 and generally forms an extension thereof, and a vertical leg 101 on an outer side thereof. The rack gears 96 and 97 each preferably extend from a front end of the slide plate 23 past a rear end thereof and across a substantial portion of the respective bottom plate extender 98 and 99. The rack gears 96 and 97 are also secured to the bottom plate extenders 98 and 99. The bottom plates 92 and 93 and the respective bottom plate extenders 98 and 99 are secured together for slidable movement relative to the rails 21 and 22 respectively.

First and second spur gears 102 and 103 are mounted in engaging relationship with the rack gears 96 and 97 respectively. The spur gears 102 and 103 are connected together by drive shaft assembly 105. The drive shaft assembly 105 is driven by a reversible electric motor 106 through transmission 107. The motor 106 and transmission 107 are mounted to an inner surface 109 of the second rail 22 by motor bracket 110.

A first end of the drive shaft assembly 105 is rotatably supported, proximate the first spur gear 102, by a first bearing 115 (not shown) which is mounted to a bearing support bracket 116 mounted to an inner surface 117 of the first rail 21. A second end of the drive shaft assembly 105, is rotatably supported, proximate the second spur gear 103, by a second bearing 118 which is mounted to the motor bracket 110.

The electric motor 106, the transmission 107, the drive shaft assembly 105, spur gears 102 and 103 and the rack gears 96 and 97 generally comprise a drive assembly or means for slidably advancing the slide plate 23 relative to the rails 21 and 22 both forward and rearward. It is foreseen that a wide variety of drive means well known in the industry could be utilized for advancing the slide plate 23 or its equivalent relative to the rails 21 and 22 or their equivalent, such as hydraulic pistons, chain drives, screw gears, scissor jacks or manual means.

As the spur gears 102 and 103 rotate to drive the slide plate 23 forward the outer lip 44 of the threshold bracket pulls against the outer surface 11 of the wall 4. As the spur gears 102 and 103 rotate to drive the slide plate rearward, the inner shoulders 53 and 54 push against the inner surface 10 of the wall 4.

Extending the rack gears 96 and 97 rearward of the rear edge 83 of the slide plate 23 permits a longer effective stroke of the slide plate 23 relative to the rails 21 and 22 while minimizing the amount of material utilized in the slide plate 23. Because the support legs 24 and 25 are mounted on the rear cross brace 35 and because the sides of the slide plate 23 only wrap around the outer sides 86 and 87 and the bottoms 88 and 89 of the rails 21 and 22 respectively, and not the inner surfaces 109 and 117 thereof, at least a portion of the slide plate 23 can be advanced past the rear ends 37 and 38 of the rails 21 and 22. This feature of the slide-plate 23, which may be referred to as a bypass feature, allows for a longer stroke length of the slide-plate 23 without having to increase the length of the rails 21 and 22.

The slide-out mechanism 19, is particularly well adapted for use with slide-out rooms 2 utilized to provide expandable sleeping quarters. FIGS. 3, 4 and 5 show the slide-out mechanism 19 with a slide-out room 2 and a bed or bed frame 125 secured thereto for retractable movement through the slide-out room opening 3. The slide-out room 2 and bed frame 125 are shown fully extended in FIG. 4 and fully retracted in FIG. 5. By utilizing the slide-out feature with respect to the sleeping quarters, a longer bed 125 can be utilized while providing for walking space at the foot of the bed 125 when the slide-out room 2 is fully extended.

The slide-out room 2 includes outer wall panel 130, side panels 131 and 132, floor panel 133, outer sealing flange 134 and inner sealing flange 135. The bed frame 125 includes side panels 141 and 142, head panel 143, foot panel 144, top panel 145 and bottom panel 146. The bottom panel 146 is adapted to be supported on and secured to the slide plate 23. The bottom panel 146 may be secured to the slide plate 23, between the rails 21 and 22, by screws or the like. A front portion of the bottom panel 146 is positioned under and secured to a rear portion of the floor panel 133 of the slide-out room 2 by screws or the like. The portions of the side panels 141 and 142 of the bed frame 125 which extend rearward of the slide-out room 2, extend below the bottom panel 146 and almost to the floor 15 of the trailer 1 when secured to the slide-out mechanism 19.

The head panel 143 of the bed frame 125 is secured to an inner surface of the outer wall panel 130 by screws or the like which ensures that the slide-out room 2 sits square relative to the bed frame 125. The bottom panel 146 of the bed frame 125 is preferably of the same width as the slide plate 23 such that inner surfaces of the side panels 141 and 142 engage the outer surfaces of the side plates 90 and 91 respectively of the slide plate 23 when the bed frame 125 is positioned on the slide-out mechanism 19, thereby ensuring that the bed frame 125 sits square relative to the slide-out mechanism 19. Assuming the relevant components of the slide-out mechanism 19, the slide-out room 2 and the bed frame 125 are all built square relative to each other, the slide-out room 2 should sit square or in alignment with the slide-out room opening 3, assuming the sides of the opening 3 are square and regardless of whether the opening 3 sits square or level with the frame 14 or floor 15 of the trailer 1.

Access holes or openings (not shown) may be formed in the foot panel 144 of the bed frame 125 to provide access to the adjustable support legs 24 and 25 of the slide-out mechanism 19.

Weather stripping or seals 148 well known in the art may be applied to an inner surface of the outer sealing flange 134 to form a weather tight seal when the slide-out room 2 is positioned in a retracted position. Similarly, weather stripping or seals 149 may be secured to an outer surface of the inner sealing flange 135 to form a weather tight seal when the slide-out room 2 is advanced to the extended position. The inner sealing flange 135 only extends across the sides and the top of the slide-out room 2 and not across the bottom thereof. To form a seal across the bottom of the slide-out room 2, when it is advanced to the extended position, a foam strip 150 (seen in crosssection in FIG. 5) may be secured to the lower surface of the floor panel 133 of the slide-out room 2 generally in planar alignment with the inner sealing flange 135. A layer of water repellent fabric 151 (not shown) is then secured across the lower surface of the floor panel 133 with the foam strip 150 extending therebetween. When the slide-out room 2 is advanced to the extended position, the foam strip 150 engages the upper surface of the rear portion 47 of the web 43 so as to form a seal thereby.

As the slide-out room 2 is advanced to the extended position, the gravitational force exerted on the front end thereof produces a torque on the slide-plate 23. The bed frame side panels 132 and 133 are preferably secured to the vertical leg 100 of the bottom plate extenders 98 and 99 respectively to resist the torque on the slide-plate 23. Once the slide-out room 2 is fully extended, engagement of the inner surface 10 of the wall 4 by the inner sealing flange 135 reduces the torque on the slide-plate 23.

In addition, engagement by the inner sealing flange 135 of the inner surface 10 of the wall 4 when the slide-out room 2 is advanced to the extended position, exerts an outwardly directed force on the wall 4. Engagement of the outer surface 11 of the wall 4 by the outer lip 44 of the threshold bracket 20 holds the wall 4 in place and resists or counteracts the outwardly directed force exerted by the inner sealing flange 135. Similarly engagement by the inner shoulders 53 and 54 of the inner surface 10 of the wall 4 counteracts the inwardly directed force exerted on the wall 4 by the outer sealing flange 134 when the slide-out room 2 is fully retracted.

It is to be understood that while certain forms of the present invention have been illustrated and described herein, it is not to be limited to the specific forms or arrangement of parts described and shown. By way of example and not as a further limitation it is noted that, although the preferred embodiment of the slide-out mechanism 19 utilizes a pair of rails 31 and 32 with the slide-plate 23 slidably secured thereto, it is foreseen that the mechanism could comprise a single rail or three or more rails. Further, it is foreseen that the slide-out mechanism 19 could comprise a wide variety of structure in which one member is stationary and a second member, to which the slide-out room 2 is to be attached, is mounted for slidable movement relative to the stationary member, such as a tube within a tube or other systems known in the art or which may be hereafter developed.

Although the preferred threshold bracket 20 is shown as a single bracket extending the entire width of the slide-out room opening 3, it is foreseen that the threshold bracket 20 could comprise a wide variety of forms. For example, a flange could be welded to the ends of each rail or stationary member so as to extend horizontally relative to the rail with the flange being adapted to be fastened to the upper surface 8 of the sill 9 to support the rail thereby and secure the rail to the wall 4. The bracket could also comprise an angle iron welded to the end of each rail so as to form a downwardly opening channel with the end of the rail such that when the bracket is positioned across the sill 9, a downwardly depending leg of the angel iron engages the outer surface 11 of the wall 4, a horizontally extending leg of the angle iron engages the upper surface 8 of the sill 9, and the end of the rail engages the inner surface 10 of the wall 4.

Further it is foreseen that a wide variety of support legs or members could be used for supporting the rear ends 37 and 38 of the rails 21 and 22 above the floor 15 including support means such as threaded rods with pivotal feet, the rods being threadingly secured to the rails 21 and 22 or rear cross-brace 35. It is also foreseen that in some applications it may not be necessary to utilize a support member for supporting the rear end of the rail or stationary member. It may be possible support the stationary member only at a front end thereof.

What is claimed and desired to be secured by Letters Patent is as follows:

1. An apparatus for selectively extending and retracting a slide-out room through a slide-out room opening in a wall of a first room, a portion of the wall comprising a sill having an upper surface which defines a lower edge of the slide-out room opening, the sill extending above a floor of the first room; said apparatus comprising:

(a) at least one stationary member;

(b) means mounted proximate a first end of said stationary member for engaging the upper surface of the sill of the slide-out room opening and supporting said first end of said stationary member thereby; and (c) a moveable member slidably mounted relative to said stationary member and adapted for securement of the slide-out room thereto such that the slide-out room may be advanced through the slide-out room opening.

2. The apparatus as in claim 1 further comprising:

(a) a height adjustable support member secured to said stationary member toward a second end thereof for supporting said second end of said stationary member.

3. The apparatus as in claim 1 further comprising:

(a) drive means secured to said stationary member for slidably advancing said moveable member relative to said stationary member.

4. The apparatus as in claim 1 wherein said first end of said stationary member is supported by the upper surface of the sill of the slide-out room opening by:

(a) a support bracket secured to said first end of said stationary member; said support bracket having an outer lip for engaging an outer surface of the wall and an inner lip for engaging an inner surface of the wall.

5. The apparatus as in claim 4 wherein:

(a) said support bracket spans the width of the slide-out room opening.

6. The apparatus as in claim 5 wherein said support bracket includes:

(a) a horizontally extending rear portion; and
(b) a front portion which slopes downward toward a front end thereof.

7. An apparatus for selectively extending and retracting a slide-out room through a slide-out room opening in a wall of a first room, a portion of the wall comprising a sill having an upper surface which defines a lower edge of the slide-out room opening, the sill extending above a floor of the first room; said apparatus comprising:

(a) at least one rail adapted to be supported proximate a first end thereof by the upper surface of the sill of the slide-out room opening and extending perpendicular thereto;

(b) a support member secured to said rail toward a second end thereof; and (c) a slide plate slidably mounted to said rail and adapted for securement of the slide-out room thereto such that the slide out room is slidably advanceable through the slide-out room opening.

8. The apparatus as in claim 7 wherein:

(a) said support member supports said second end of said rail above the floor of said first room and is height adjustable for adjusting the height of said second end of said rail above the floor.

9. The apparatus as in claim 7 further comprising:

(a) drive means secured to said rail for slidably advancing said slide plate relative to said rail.

10. The apparatus as in claim 7 wherein said first end of said rail is supported by the upper surface of the sill of the slide-out room opening by:

(a) a support bracket secured to said first end of said rail; said support bracket having an outer lip for engaging an outer surface of the wall and an inner lip for engaging an inner surface of the wall.

11. The apparatus as in claim 10 wherein:

(a) said support bracket spans the width of the slide-out room opening.

12. The apparatus as in claim 11 wherein said support bracket includes:

(a) a horizontally extending rear portion; and
(b) a front portion which slopes downward toward a front end thereof.

13. An apparatus for selectively extending and retracting a slide-out room through a slide-out room opening in a wall; said apparatus comprising:

(a) a first rail and a second rail each having a first end and a second end;

(b) a threshold bracket secured to said first ends of said first and second rails and extending perpendicular thereto; said threshold bracket adapted to be positioned on and supported by an upper surface of a sill of the slide-out room opening; said threshold bracket further having an outer lip for engaging an outer surface of the wall and an inner lip for engaging an inner surface of the wall;

(c) first and second support legs secured to said first and second rails respectively toward second ends thereof; and (d) a slide plate slidably mounted to said first and second rails and adapted for securement of the slide-out room thereto such that the slide-out room is slidingly advanceable through the slide-out room opening.

14. The apparatus as in claim 13 wherein said slide plate includes:

(a) a top plate extending between and across said first and second rails;

(b) first and second side plates extending across outer sides of said first and second rails respectively;

(c) first and second bottom plates extending at least partially across bottoms of said first and second rails respectively; and (d) first and second racks mounted to said first and second bottom plates respectively and engaged by first and second spur gears rotatably mounted to said first and second rails respectively and mounted in engaging relationship with said first and second racks.

15. The apparatus as in claim 14 wherein said slide plate further comprises:

(a) first and second bottom plate extenders secured to said first and second bottom plates respectively in axial alignment therewith and extending rearward therefrom and having portions of said first and second racks respectively secured thereto.

16. The apparatus as in claim 13 wherein said threshold bracket includes:

(a) a horizontally extending rear portion; and
(b) a front portion which slopes downward toward a front end thereof.

17. An apparatus for selectively extending and retracting a slide-out room through a slide-out room opening in a wall; said apparatus comprising:

(a) at least one stationary member;

(b) means mounted proximate a first end of said stationary member for engaging an upper surface of a sill of the slide-out room opening and supporting said first end of said stationary member thereby;

(c) a moveable member slidably mounted relative to said stationary member and adapted for securement of the slide-out room thereto such that the slide-out room may be advanced through the slide-out room opening; and (d) a height adjustable support member secured to said stationary member toward a second end thereof for supporting said second end of said stationary member.

18. An apparatus for selectively extending and retracting a slide-out room through a slide-out room opening in a wall; said apparatus comprising:

(a) at least one stationary member;

(b) means mounted proximate a first end of said stationary member for engaging an upper surface of a sill of the slide-out room opening and supporting said first end of said stationary member thereby; and (c) a moveable member slidably mounted relative to said stationary member and adapted for securement of the slide-out room thereto such that the slide-out room may be advanced through the slide-out room opening; and (d) a support bracket secured to said first end of said stationary member; said support bracket having an outer lip for engaging an outer surface of the wall and an inner lip for engaging an inner surface of the wall.

19. The apparatus as in claim 18 wherein:

(a) said support bracket spans the width of the slide-out room opening.

20. The apparatus as in claim 19 wherein said support bracket includes:

(a) a horizontally extending rear portion; and (b) a front portion which slopes downward toward a front end thereof.

21. An apparatus for selectively extending and retracting a slide-out room through a slide-out room opening in a wall; said apparatus comprising:

(a) at least one rail adapted to be supported proximate a first end thereof by an upper surface of a sill of the slide-out room opening and extending perpendicular thereto;

(b) a support member secured to said rail toward a second end thereof;

(c) a slide plate slidably mounted to said rail and adapted for securement of the slide-out room thereto such that the slide out room is slidably advanceable through the slide-out room opening; and (d) said support member supports said second end of said rail above a floor of a first room relative to which said slide-out room extends and retracts; said support member is height adjustable for adjusting the height of said second end of said rail above the floor.

22. An apparatus for selectively extending and retracting a slide-out room through a slide-out room opening in a wall said apparatus comprising: (a) at least one rail adapted to be supported proximate a first end thereof by an upper surface of a sill of the slide-out room opening and extending perpendicular thereto;

(b) a support member secured to said rail toward a second end thereof;

(c) a slide plate slidably mounted to said rail and adapted for securement of the slide-out room thereto such that the slide out room is slidably advanceable through the slide-out room opening; and (d) a support bracket secured to said first end of said rail; said support bracket having an outer lip for engaging an outer surface of the wall and an inner lip for engaging an inner surface of the wall.

23. The apparatus as in claim 22 wherein:

(a) said support bracket spans the width of the slide-out room opening.

24. The apparatus as in claim 23 wherein said support bracket includes:

(a) a horizontally extending rear portion; and (b) a front portion which slopes downward toward a front end thereof.

* * * * *